US008311940B2

(12) United States Patent
Shuster

(10) Patent No.: US 8,311,940 B2
(45) Date of Patent: Nov. 13, 2012

(54) CONDITIONAL BALANCE MANAGEMENT FOR NON-ISSUER DEBIT INSTRUMENTS

(76) Inventor: Gary Stephen Shuster, Fresno, CA (US)

(*) Notice: Subject to any disclaimer, the term of this patent is extended or adjusted under 35 U.S.C. 154(b) by 15 days.

(21) Appl. No.: 13/075,154

(22) Filed: Mar. 29, 2011

(65) Prior Publication Data

US 2011/0238577 A1 Sep. 29, 2011

Related U.S. Application Data

(60) Provisional application No. 61/318,533, filed on Mar. 29, 2010.

(51) Int. Cl.
*G06Q 40/00* (2012.01)
*G06Q 20/00* (2012.01)

(52) U.S. Cl. ............... 705/39; 705/17; 705/35; 705/44

(58) Field of Classification Search .................. None
See application file for complete search history.

(56) References Cited

U.S. PATENT DOCUMENTS

| | | | | |
|---|---|---|---|---|
| 5,721,768 A * | 2/1998 | Stimson et al. | ......... | 379/114.16 |
| 5,893,907 A * | 4/1999 | Ukuda | ............. | 705/35 |
| 6,463,139 B1 * | 10/2002 | Davitt et al. | ............. | 379/144.01 |
| 6,856,674 B1 * | 2/2005 | De Trana et al. | ........ | 379/114.2 |
| 7,254,222 B1 * | 8/2007 | Bauer et al. | ............... | 379/114.2 |
| 7,267,263 B2 | 9/2007 | Iwakura | | |
| 7,280,984 B2 | 10/2007 | Phelan, III et al. | | |
| 7,337,947 B1 * | 3/2008 | Swanson, Sr. | ............... | 235/375 |
| 7,431,208 B2 | 10/2008 | Feldman et al. | | |
| 7,445,150 B2 | 11/2008 | Aigbogun | | |
| 7,494,048 B2 | 2/2009 | Gusler et al. | | |
| 7,580,889 B2 | 8/2009 | Suzuki et al. | | |
| 7,660,574 B2 * | 2/2010 | Niimi | ............................ | 455/407 |
| 7,739,162 B1 * | 6/2010 | Pettay et al. | .................... | 705/35 |
| 7,891,561 B2 | 2/2011 | Hanna | | |
| 8,190,517 B1 * | 5/2012 | Baker et al. | ..................... | 705/39 |
| 2001/0001856 A1 * | 5/2001 | Gould et al. | .................... | 705/39 |
| 2001/0037209 A1 * | 11/2001 | Tarbutton et al. | ................ | 705/1 |
| 2002/0019806 A1 * | 2/2002 | Tamura | ......................... | 705/39 |
| 2002/0022966 A1 * | 2/2002 | Horgan | ........................... | 705/1 |
| 2003/0004828 A1 * | 1/2003 | Epstein | .......................... | 705/26 |
| 2003/0046249 A1 * | 3/2003 | Wu | ................. | 705/79 |
| 2003/0097344 A1 * | 5/2003 | Chaum et al. | ................. | 705/75 |
| 2003/0200180 A1 * | 10/2003 | Phelan et al. | ................... | 705/65 |
| 2004/0249752 A1 * | 12/2004 | Prato et al. | ....................... | 705/41 |
| 2005/0035847 A1 * | 2/2005 | Bonalle et al. | ............... | 340/5.61 |

(Continued)

OTHER PUBLICATIONS

"Stored-value Card", http://en.wikipedia.org/wiki/Stored-value_card, (last modified) Feb. 18, 2011, Wikimedia Foundation, Inc.

(Continued)

*Primary Examiner* — Gregory Johnson
(74) *Attorney, Agent, or Firm* — Connolly Bove Lodge & Hutz LLP; Jonathan Jaech

(57) ABSTRACT

A computer receives information about a debit account controlled by a third-party issuer, a user owing the account and instructions for managing the account after a specified trigger date. Operating according the instructions, an unknown remaining balance in the account may be exhausted after the trigger date has passed, using a sequence of charges responsive to the initial balance, to the last charge amount completed or attempted, and to whether or not the last charge amount is accepted. In the alternative, or in addition, the account may be managed to convert the remaining balance to a non-monetary coupon (e.g., "virtual currency") for use in an online computer game or the like, after the trigger date.

14 Claims, 5 Drawing Sheets

U.S. PATENT DOCUMENTS

| | | | |
|---|---|---|---|
| 2005/0038714 A1* | 2/2005 | Bonet et al. | 705/26 |
| 2005/0080728 A1* | 4/2005 | Sobek | 705/39 |
| 2005/0165682 A1* | 7/2005 | Duke | 705/41 |
| 2006/0116912 A1* | 6/2006 | Maes | 705/4 |
| 2007/0106611 A1* | 5/2007 | Larsen | 705/44 |
| 2007/0108268 A1* | 5/2007 | Graves et al. | 235/380 |
| 2007/0179888 A1* | 8/2007 | Angelovich | 705/41 |
| 2007/0203788 A1* | 8/2007 | Andalib et al. | 705/14 |
| 2007/0250389 A1* | 10/2007 | Holtz | 705/14 |
| 2007/0284439 A1* | 12/2007 | Rosenblatt | 235/380 |
| 2008/0126211 A1 | 5/2008 | Kaufhold | |
| 2008/0270246 A1* | 10/2008 | Chen | 705/17 |
| 2008/0275773 A1* | 11/2008 | Assadian | 705/14 |
| 2009/0063341 A1* | 3/2009 | Clarke et al. | 705/41 |
| 2009/0063344 A1 | 3/2009 | Travis et al. | |
| 2009/0099947 A1* | 4/2009 | Boehm et al. | 705/35 |
| 2009/0182663 A1* | 7/2009 | Hurst | 705/41 |
| 2009/0222301 A1* | 9/2009 | Phillips et al. | 705/7 |
| 2009/0222339 A1* | 9/2009 | Antao et al. | 705/14 |
| 2009/0287579 A1* | 11/2009 | Walker et al. | 705/21 |
| 2010/0023435 A1* | 1/2010 | Elko et al. | 705/35 |
| 2010/0049653 A1 | 2/2010 | Grotto | |
| 2010/0121764 A1* | 5/2010 | Niedermeyer | 705/44 |
| 2010/0318446 A1* | 12/2010 | Carter | 705/30 |
| 2011/0153462 A1* | 6/2011 | Granich | 705/27.1 |
| 2011/0161155 A1* | 6/2011 | Wilhelm et al. | 705/14.27 |
| 2011/0295744 A1* | 12/2011 | Wisniewski et al. | 705/41 |
| 2012/0011062 A1* | 1/2012 | Baker et al. | 705/41 |
| 2012/0047041 A1* | 2/2012 | Akel | 705/24 |

OTHER PUBLICATIONS

Consumers Union Financial Services Team, "State Gift Card Consumer Protection Laws", Consumers Union, http://www.consumerunion.org/pub/core_financial_services/003889.html, Sep. 15, 2009, Consumers Union of U.S., Inc., San Francisco, CA.

* cited by examiner

CONDITIONAL BALANCE MANAGEMENT FOR NON-ISSUER DEBIT INSTRUMENTS

CROSS-REFERENCE TO RELATED APPLICATION

This application claims priority pursuant to 35 U.S.C. §119 (e) to U.S. provisional application Ser. No. 61/318,533, filed Mar. 29, 2010, which application is specifically incorporated herein, in its entirety, by reference.

BACKGROUND

1. Field

The present disclosure relates to managing a credit balance in a debit account, and more particularly to conditional balance exhaustion and/or conversion of debit accounts under the control of another entity.

2. Description of Related Art

The market for pre-paid credit cards and debit cards has grown exponentially over the past decades. One of the most popular gifts is a store credit or Visa™ Mastercard™, or American Express™ branded pre-loaded credit card, which is linked to an issuer-controlled debit account. The debit account is provided with an initial fixed balance typically equal to, or related to, an initial purchase price for the card. Purchases may be made up to the remaining debit balance in the account, but are refused if the purchase exceeds the remaining balance. It is often difficult or inconvenient for non-issuers, including consumers and retailers, to determine the debit balance at any particular time. Consequently, after using the card for some purchase less than the initial debit balance, the remaining debit balance may sit unused and eventually be forgotten by the card holder.

Card issuers may endeavor to profit from these forgotten unused debit balances, to the detriment of the debit card holders. For example, a common business model among issuers of pre-paid credit cards is to charge some fee upon issuance, and to charge a maintenance fee billed against the unused balance and/or to forfeit any unused balance at the end of the card's term, all while enjoying the interest-free "float" on the balance. Similarly, the prevailing business model for store-only "gift" cards is to enjoy the "float" and void the balance after some period of time. Different jurisdictions have regulated and, in some cases, prohibited portions of this business model. Even where voiding the balance is prohibited and maintenance fees are prohibited, billions of dollars of value nonetheless are never used and, as a practical matter, are forfeited through such non-use.

Because of the disparity between regulations for prepaid credit cards and prepaid store gift cards, consumers are often met with the hard choice of giving a more broadly useful prepaid credit card, or giving a store gift card subject to fewer forfeiture risks.

The current regulatory regime in the United States varies by state and is subject to change. For example, as of 2010 in California, no expiration dates or fees are permitted except for a $1 monthly fee for reloadable cards with a balance of $5 or less when the card has been unused for 24 months. Further, any card with a cash value of $10 or less may be redeemed for cash. In comparison, as of 2010, Florida prohibited expiration dates or fees except for cards linked to bank accounts usable with multiple unaffilliated merchants. A federal law will prohibit expiration for 5 years, but permits fees after 12 months. To avoid unfavorable regulations, issuers of debit cards may set up subsidiaries in states whose laws are more favorable and then export the cards for use in states with regulations less favorable for the card issuer. For example, one issue of great concern to issuers is having unused balances fall under abandoned property law and escheat to the state. Issuers may avoid jurisdictions which do not permit the issuers to recapture at least a portion of abandoned debit balances.

Notwithstanding regulations on debit card issuer conduct regarding unused debit account balances, consumers and other non-issuers of debit accounts such as debit cards often experience difficulties in recovering unused credit balances that are under the control of an issuer that is unwilling or unable to refund the unused balance in a convenient manner. Technological solutions that do not depend on the cooperation of the debit account issuer to report or refund an unused debit balance are not presently available.

SUMMARY

Certain useful, novel, and non-obvious improvements over the prior art methods of handling unused credit balances in payment cards are disclosed herein. The disclosure includes technological solutions to enable consumers and other non-issuers of debit accounts such as debit cards to conveniently recapture a greater portion of unused credit balances, even when such balances are under the control of an issuer that is unwilling or unable to simply refund the unused balance in a convenient manner. These solutions do not depend on the cooperation of the debit account issuer to take any actions for a refund of an unused balance.

In an aspect, the present technology includes registering an identifier for a debit account controlled by a third-party issuer and having an authorized user, and an associated future date in a database, using at least one computer. For example, using an online user interface, a user may register a debit card issued by "Bank A" with a separate service company operating the interface, by entering the card number, issuer, and any security information needed for charging the debit card in a sales transaction, user account information such as name, address, and contact information, and a future date for exhausting any debit balance remaining on the card. Then, the computer or another computer may be used for automatically monitoring a current date, using at least one computer, to determine when the future date equals the current date. Then, in response to determining that the future date equals the current date, the computer may be used for automatically charging the account using at least one charge transaction for a remaining balance amount that substantially exhausts the debit balance of the debit account. In response to automatically charging the account for the remaining balance amount, the computer may initiate a payment transaction for an amount computed using the remaining balance amount according to payment instructions received from the authorized user.

In an aspect, automatically charging the account further comprises the at least one charge transaction as a sequence of charges for diminishing amounts. This may be done when the card issuer will not report a remaining card balance to entity having the responsibility for depleting the remaining balance. The sequence of charges may be determined based on the initial balance, for example as a sequence of halves. For example, given an initial balance in the amount of "B", the sequence may be ½B, ¼B, ⅛B, and so forth, rounded to the nearest penny or other smallest available monetary unit, until the amount charged is less the smallest available monetary unit. Other diminishing sequences may also be used; for example, B; 99*B/100; 98*B/100 etc. In the alternative, or in addition, a fixed or increasing sequence may be used until a charge is refused, followed by declining amounts after a refusal; for example, B/10, B/10, B/10 until a charge is declined; after a decline a smaller fraction of B such as B/20, B/20, and so forth. The underlying principal is that the charge amount is not related to a current balance of the debit account, which is unknown. Instead, it is related to the initial balance reported by the user and to the last charge amount, depending on whether or not the last charge amount is accepted by the account issuer.

In another aspect, the present technology includes managing a debit balance according to a currency conversion feature. After a termination date, any remaining balance may be converted to a virtual currency without any definite termination date or forfeiture. A computer-implemented method according to the currency conversion technology may include creating an account record in a computer memory device on a first date, using at least one computer, wherein the account record defines a debit balance expressed in a monetary currency unit. The method may further comprise maintaining a record of a defined exchange rate between the monetary currency unit and a corresponding non-monetary coupon unit in a computer memory device, using at least one computer. The method may further comprise using at least one computer responsive to current value of the defined exchange rate to maintain a debit balance in the account record responsive to monetary currency transactions and to non-monetary coupon transactions, until a predetermined second date falling after the first date. The method may further comprise, beginning on the second date, using at least one computer to maintain a debit balance in the account record responsive only to non-monetary coupon transactions and not to monetary currency transactions. Therefore the user may receive the benefit of the remaining account balance only in the non-monetary coupon, after the second date.

A more complete understanding of the method and system for conditional balance management for non-issuer debt instruments will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION

Figure 1:
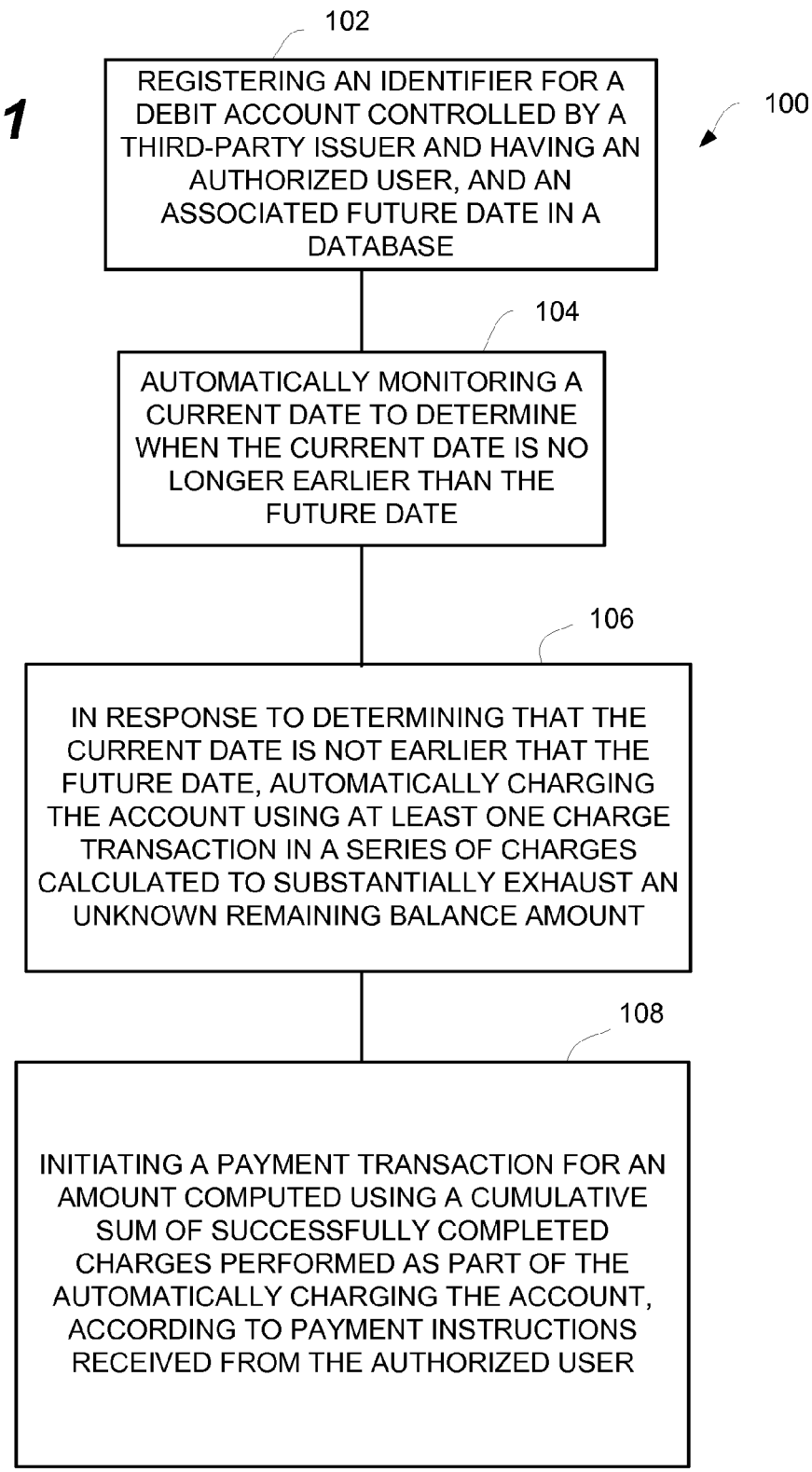
FIG. 1 is a flow diagram showing a method for conditional balance exhaustion of a third-party issued account.

The present disclosure provides a system, apparatus and method for managing handling unused credit balances in payment card. The present technological solutions enable consumers and other non-issuers of debit accounts to conveniently recapture a greater portion of unused credit balances, even when such balances are under the control of an issuer that is unwilling or unable to simply refund the unused balance in a convenient manner. These solutions do not depend on the cooperation of the debit account issuer to take any actions for a refund of an unused balance, or even to disclose a remaining balance.

In general, the method disclosed herein may be implemented using card reading devices, merchant terminals, computer servers, data storage hardware, communications hardware, and related hardware and software to carry out the actions and operation described herein. A central server or servers may be programmed using software encoded in a computer-readable media to perform certain essential steps causing implementation of the method at the server or through a system of interconnected hardware implementing the payment card system.

A payment card is encoded with a unique identifier, which may be encrypted as known in the art. The card may be offered for sale and purchased or exchanged for a promised face value. For example, an individual may purchase a card with a $100 face value for $100, or receive the card in lieu of a $100 cash rebate. In a one implementation, a card purchaser (either the original purchaser or the final recipient) registers the card by providing the identifier to an entity that tracks the card using a computer server or servers, herein called a tracking server. The tracking server may receive and record all of the information necessary to make charges against the card (for example, with a Visa card, the card number and if needed any expiration date, CVV2 number, and/or PIN), using a computer database. In addition, the tracking computer also receives and records, or generates and records, a date on which the card is to be converted into cash or some other thing of value. The card identifier may be associated with an algorithm for handling unused balances after the recorded date, according to the initial transaction terms and conditions.

For illustrative purposes, imagine that Grandma Riding wants to give her granddaughter, Red, a prepaid Visa card on Jan. 1, 2010. The card is issued in California and the card issuer provides that an up-front fee is charged (so the $100 gift card costs $105 at the store), and further subject to the condition that is the balance drops below $5 then remains untouched for 24 months, it will be reduced by $1 per month. California, under Title 2, Subchapter 8, of its Administrative Code, takes the position that an unused balance over $5 will escheat to the state at a set point in time. Red gets the card and realizes that she is likely to use most of it but then forget to finish using it. For example, she might make a $97 purchase but then be unable to figure out how to clean the last $3 off the card as partial payment of another purchase. She also realizes she might lose the card or simply forget to use it. She decides to register the card with an entity called "Invention Company" providing conditional balance exhaustion as described herein. The Invention Company operates a transaction server and database in communication with a transaction system used for clearing transactions made using the card, as known in the art.

Red therefore provides the card information online to Invention Co.'s server and enters into agreement whereby the Invention Company (or its agent) is authorized to clear the balance of the card on a specified date, for example, Dec. 31, 2010. Invention Company does nothing until Dec. 31, 2010. On that date, using its transaction server, it automatically submits a charge for the full original balance of the card (or some other predetermined amount) via the applicable transaction system. If that charge is denied, the transaction server generates and submits a charge for a reduced amount, for example, 50% of the balance; if the lesser charge is denied then the server submits a charge for a still lesser amount, e.g. 25% of the balance, and so forth, until the transaction server successfully completes a charge. If, for example, the server retrieves $25 when trying for 25% of the balance, it then knows that between $0 and $24.99 remain on the card (having failed to charge $50 previously). It then repeats the process to retrieve a remaining amount between $0.01 and $24.99. This process is repeated until the full balance of the card is reduced to zero, or to some number less than a specified minimum threshold. In other preferred implementations, the card issuer is required or asked to provide the balance so it may be charged with precision, to refund the balance directly, or the remaining balance is encoded on the card or retrievable via a network or other communications connection, and charged. The Invention Co provides Red with a check, bank transfer or other payment for the amount charged to the card using Invention Co's server (or a new card is issued with that balance), optionally after deducting a fee for the service.

The card itself may be denominated in multiple currencies. The value of the card may be fixed (i.e. "this card is worth $100 "dollar units", each worth $1 US dollar or $1 Canadian Dollar, and the "dollar units" are reduced by one for each US or Canadian dollar spent). Upon issuance, the card issuer uses a computer program to retrieve the then-current futures on US/Canadian dollar trades, and executes a computerized purchase of a hedge position to reduce the risk of currency fluctuation. The type and amount of hedge position is calculated based on past card use either by this consumer (as, for example, determined by past experience) or by consumers with similar demographics or consumers generally.

In a some embodiments, the multiple currencies may consist of at least one government-backed currency, such as the U.S. Dollar, and at least one virtual currency or other virtual right. So for example, Red might be given a card worth $100 United States Dollars or 100 Virtual Financial Units ("VFUs"). In this example, the VFUs might be 1,000 Utherverse Rays or 1,000 Linden Dollars (or whatever amount the then-prevailing exchange rate dictates). The terms of the card purchase are such that the contract provides the purchase is buying virtual currency only, but with a fixed conversion right that lasts a set amount of time, for example one year. At the end of the conversion right period, the balance of the card is automatically converted into the VFUs (either at a fixed rate or based on the then-prevailing exchange rate). It is important to note that VFUs can also take the form of affinity points, such as AAdvantage Airlines miles, HHonors hotel points, or any other non-monetary coupon unit. VFUs can also take the form of store-bound or merchant-bound value, so that at the end of a year the card converts to a store credit at the issuing store only, or certain rights within the issuing store (for example, a Blockbuster card that converts each remaining $5 to the right to rent one movie for 3 days).

In some embodiments, the user links the card to the issuer of the VFUs either upon purchase or shortly thereafter. In this way, if the user forgets to utilize the card, no further action is required on their part to have the card automatically convert into the VFUs and credit to the user's account. A less desirable implementation may require the user to manually enter the VFUs using the card after expiration.

It is important to understand that while the card may be designed to simultaneously carry more than one independent funding value (i.e. it is worth BOTH $50 United States Dollars and 500 VFUs, and they are spent independently), the preferred implementation is to have the card denominated in multiple currencies or values, but to have the values transparently interchanged upon use. Thus, for example, United Airlines might issue pre-paid Visa Cards charged with $500 United States dollars and 10 "Red Carpet Club" visits (where the visits are the VFUs). If the user visits a Red Carpet Club, the card is charged 1 "Red Carpet Club" visit, and the dollar value and remaining visits are both reduced, to $450 and to 9 visits respectively. Similarly, if a user obtains a prepaid visa card with $100 and 1,000 VFU "Rays" virtual currency units, the user may want to purchase a virtual hotel room with the "Virtual Vancouver" game for 100 Rays. The card balance would then be reduced by 100 VFUs to 900 VFUs, and simultaneously the dollar value reduced by the value of 100 VFUs, which is a 10:1 ratio, or $10. Although it may make it difficult to understand the current value of the card, use of a floating, rather than fixed, exchange rate is possible. In a preferred implementation, the card may be configured to display the current balance in both currencies (or more than 2 currencies if applicable) is possible. For example, the card itself may contain a window showing the current value in dollars and VFUs, and as the exchange rate changes, it may obtain new exchange rates wirelessly, when used to make a charge, or when connected to a computer or similar device. The "card" may actually take the form of an application running on a mobile device or computer, and in that manner be continually updated.

In one implementation, the card is recharged automatically when a user obtains additional VFUs. For example, if tied to a frequent flier program, when a user flies, their news frequent flier balance is reflected in the card balance. The dollar value of those new VFUs may be spent simply by utilizing the card. Similarly, virtual world actions may earn VFUs that can be reflected on the card.

It is important to understand that the term "card" is utilized for convenience. No physical card is required, and this invention can be implemented using a password/user name system, a printed paper system, a coded chip, biometrics, or generally any manner of uniquely identifying an individual or instrument.

By allowing card issuers to take outstanding balances off of their books at a fixed time, issuers obtain substantial benefits from these inventions. At the same time, consumers avoid the problems of express forfeiture (through fees and expiration) as well as the problems of forfeiture through forgetfulness.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/operations, it is to be understood and appreciated that the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Consistent with the foregoing, FIG. 1 is a flow chart showing an example of a method 100 for conditionally exhausting a debit balance. Method 100 may comprise registering 102 an identifier for a debit account controlled by a third-party issuer and having an authorized user, and an associated future date in a database, using at least one computer, for example using a third-party service provider server 312 as mentioned above (FIG. 3). A user issued a debit card or similar instrument linked to a debit account may log on to the server via any suitable client, and input information for registering the card, via a network connection. The user may specify herself or any other person as the authorized user. The registering server may store the entered information using any suitable computer memory device. The future date may be any date prior to the expiration date of the account, on which the user desires to deplete the remaining balance of the account.

Method 100 may further comprise automatically monitoring 104 a current date, using at least one computer, to determine when the future date equals the current date or when the current date is not earlier than the future date. In response to determining that the future date equals the current date or that the current date is not earlier than the future date—i.e., on or after the designated future date—method 100 may further comprise automatically charging 106 the account using at least one charge transaction automatically charging the account using at least one charge transaction in a series of charges calculated to substantially exhaust an unknown remaining balance amount. Various details for charging are explained hereinabove and below. For example, as further explained above, the server may implement the charge transaction as a sequence of charges for diminishing amounts.

For further example, the server may calculate an initial one of the series of charges based on an initial balance of the debit account reported by the user in conjunction with registering the identifier; for example some selected fraction of the initial balance. Automatically charging the account may further comprise calculating one or more charges in the series of charges based at least in past on whether or not any preceding one of the series of charges is accepted by the third-party issuer. For example, a charge amount may be reduced by a first predetermined amount or fraction in response to refusal of the immediately preceding charge amount, and reduced, held constant, or increased by a second predetermined amount in response to acceptance of the immediately preceding charge amount. Accordingly, automatically charging the account may further comprise calculating one or more charges in the series of charges based at least in part on an amount of any preceding one of the series of charges. For example, automatically charging the account may further comprise continuing the automatically charging using generally diminishing charge amounts until a charge amount not greater than a smallest applicable monetary unit (for example, one cent) is refused by the third-party issuer.

Finally, in response to automatically charging the account for the remaining balance amount, the server may initiate 108 a payment transaction for an amount computed using a cumulative sum of successfully completed charges performed as part of the step of automatically charging the account, according to payment instructions received from the authorized user. For example, the server may pay the sum amount of a series of charges successfully completed, less a service charge and/or transaction fee. For further example, the server may initiate the payment transaction for a non-monetary coupon amount restricted for use in a specified online environment, e.g., a VRU virtual currency payment.

Figure 2:
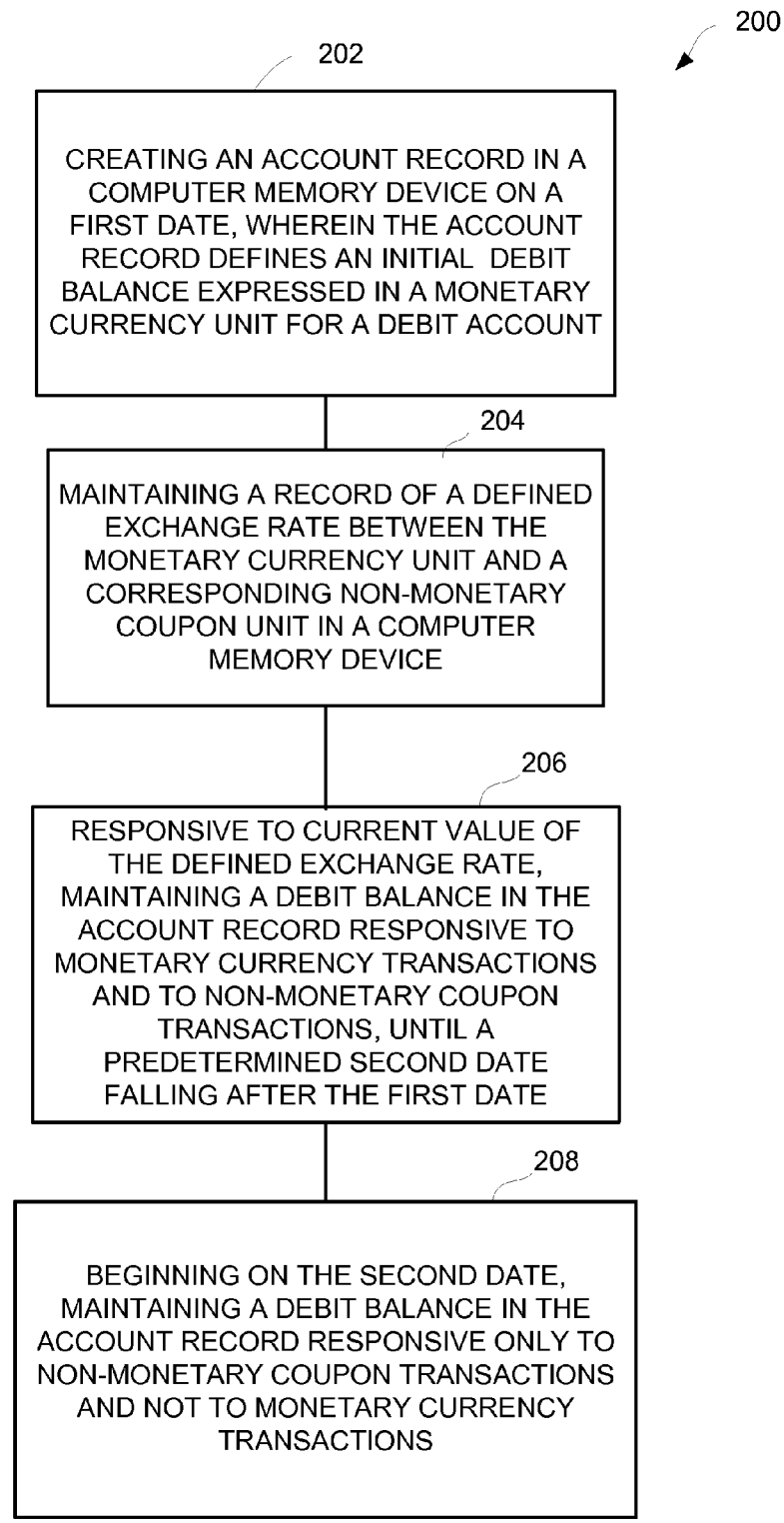
FIG. 2 is a flow diagram showing a method for managing a debit balance in an account according to a virtual currency conversion feature.
Figure 3:
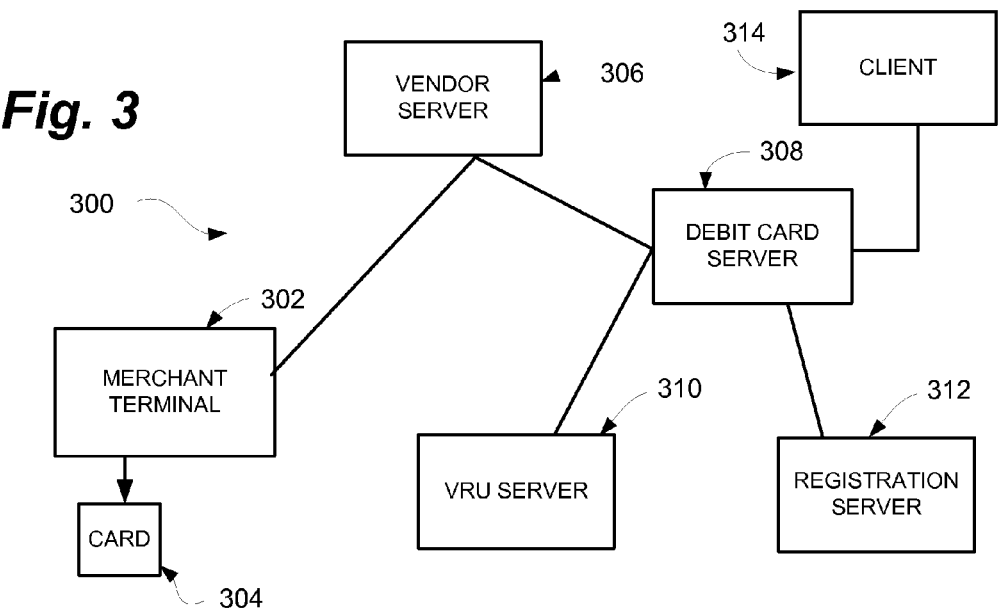
FIG. 3 is a system diagram illustrating an example of system including one or more components for performing methods as described herein.

FIG. 2 is a flow chart showing an example of a method 200 for managing a debit balance in an account. Method 200 may comprise creating 202 an account record in a computer memory device on a first date, using at least one computer, wherein the account record defines a debit balance expressed in a monetary currency unit. For example, a debit card server 308 may initialize an account in response to transaction information from a merchant point-of-sale terminal 302 (FIG. 3). The server may further perform maintaining a record 204 of a defined exchange rate between the monetary currency unit and a corresponding non-monetary coupon unit in a computer memory device. This may be a fixed or floating exchange rate.

Method 200 may further comprise using at least one computer (e.g., account server 308) responsive to current value of the defined exchange rate to maintain 206 a debit balance in the account record responsive to monetary currency transactions and to non-monetary coupon transactions, until a predetermined second date falling after the first date. For example, the account server 308 may respond to transactions from either, or both, of the vendor server 306 (transacting in the currency) and the VRU server 310 (transacting in the coupon units). The server 308 may service transactions using the account until the predetermined second date. However, if the account balance is completely depleted prior to the second date, the account may be closed and the method terminated at that time.

If the account is not depleted (i.e., zero balance) prior to the second date, then beginning on the second date, the server may thereafter maintain 208 a debit balance in the account record responsive only to non-monetary coupon transactions and not to monetary currency transactions. The server may refuse use of the payment account for any monetary currency transaction, beginning on the second date. The server may maintain a fixed value for the exchange rate beginning on the second date, whether or not the exchange rate was permitted to float prior to the second date. Optionally, the server may convert the debit balance from the monetary currency unit to the non-monetary coupon unit using the exchange rate on the second date, and thereafter maintain the account record expressed only in the non-monetary coupon unit. Either way, after the second date the debit account has no cash value per se for money, and is only redeemable for items that can be exchanged for the non-monetary coupons, for example, virtual items in an on-line VRU.

FIG. 3 as referenced above is a block diagram showing elements of a system 300 that may be used to implement either or both of methods 100 and 200, and similar methods based on the disclosure herein. The system 300 may comprise a debit card management server 308, which may perform the account management operations as described herein. The debit card management server may communicate with one or more vendor servers 306, wherein this example the vendor server 305 generally represents one or more servers used by a third-party issuer of the debit account to authorize charges to the debit account. A user of a debit card 304 or the like may use one or more merchant terminals 302 to initiate normal charges against the debit card balance. The merchant terminals 302 communicate with the vendor server 306, which debits the account balance for the card 304 in response to a successfully completed charge transaction at the terminal 302. The system 300 may further include a Virtual Reality Universe (VRU) server 310 in communication with the debit card server 308, and a registration server 312 handing initial registration of the debit card 302 for date-driven balance management. The functions of the debit card server 308, VRU server 310 and registration server 312 may be consolidated in, or distributed among, any desired non-zero number of computer servers or the like. The debit card server 308 may communicate with one or more client terminals 314, which may comprise, for example, a personal computer, laptop computer, notebook computer, notepad computer, smart phone, or the like. Communications between components of the system 300 may be accomplished via any suitable wired or wireless network, or any suitable combination of such networks; for example, using an Internet Protocol (IP) Wide Area Network (WAN).

Figure 4:
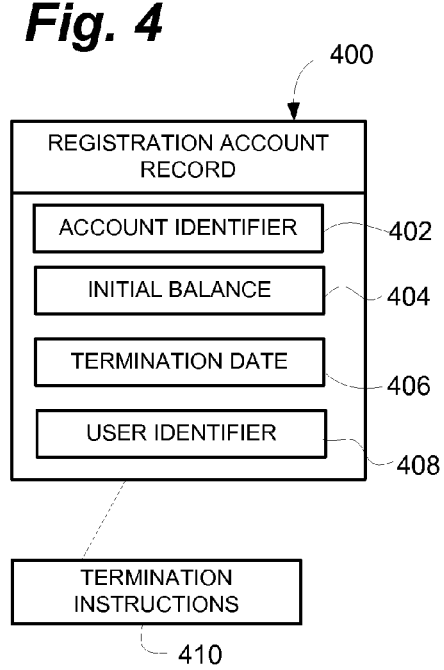
FIG. 4 is a block diagram illustrating a registration account record.

FIG. 4 is a block diagram showing elements of a registration account record 400 and associated records as may be used by a registration server in method 100, or similar methods. The registration account record 400 may comprise an account identifier 402 for the associated debit account. This account may be used, for example, for charging the debit account according to an applicable merchant agreement, while the debit account itself remains under the control of a third-party issuer. The registration account record 400 may further comprise an initial balance value 404 as reported by the user during registration. Typically, the initial balance value 404 is not available from the third party issue; and generally, the current balance value is not available from the third-party issuer. The registration account record 400 may further comprise a termination date value 406, sometime referred to herein as a "future date." This is the future date, typically several months up to several years after initial registration, at which the user desires to implement the balance exhaustion procedure as described herein. However, the present technology does not preclude the user from selecting a termination date immediately after registration, for example to quickly cash out a debit card without any intervening period of use. The registration account record 400 may further comprise user identification records 408, for example a user name, mailing address, email address, phone number, and so forth. The registration record 400 may include or be associated with termination instructions 410, which specify the actions to be taken by a balance exhaustion server on the termination date. These instructions may include, for example, a payment account for receiving any proceeds resulting from a balance exhaustion procedure.

Figure 5:
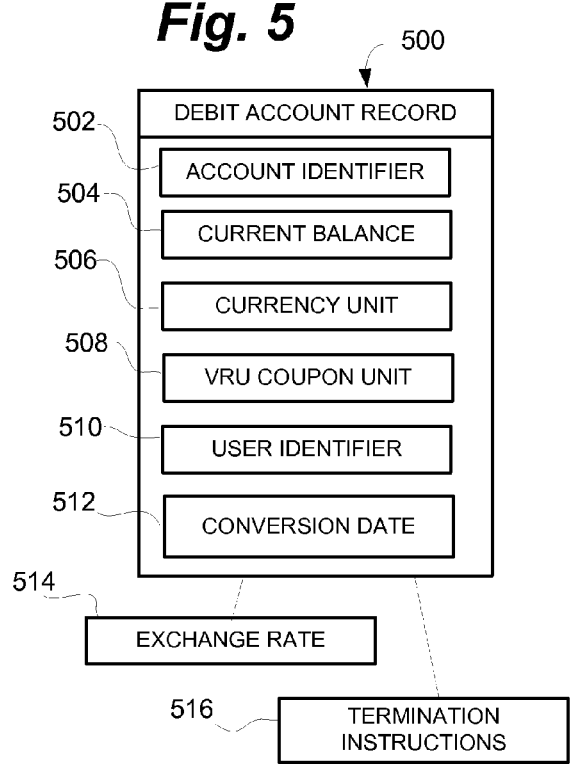
FIG. 5 is a block diagram illustrating a debit account record.

FIG. 5 is a block diagram showing elements of a debit account record 500 and associated records as may be used by a debit account server in method 200 or in similar methods. The debit account record 500 may comprise an account identifier 502 for a debit account, and a current balance amount 504 of the debit account. The debit account itself may be under control of another entity, but at minimum the current account balance should be accessible. The debit account record 500 may further comprise a designated currently unit 506 for maintaining the current balance 504, and at least one VRU coupon or "virtual currency" unit 508 for implementing the described currency conversion feature. The debit account record 500 may further comprise user identifier data 510 similar to that described for the registration account record 400, and a conversion date 512 for implementing the described currency conversion operations. The debit account record 500 may include, or be associated with, fluctuating exchange rate data 514 relating a current exchange rate between the currency unit and one or more VRU coupon units. The debit account record 500 may include or be associated with termination instructions 516, which specify the actions to be taken by a currency conversion server on the termination date. These instructions may include, for example, a VRU coupon account for receiving any proceeds resulting from a currency conversion procedure.

Figure 6:
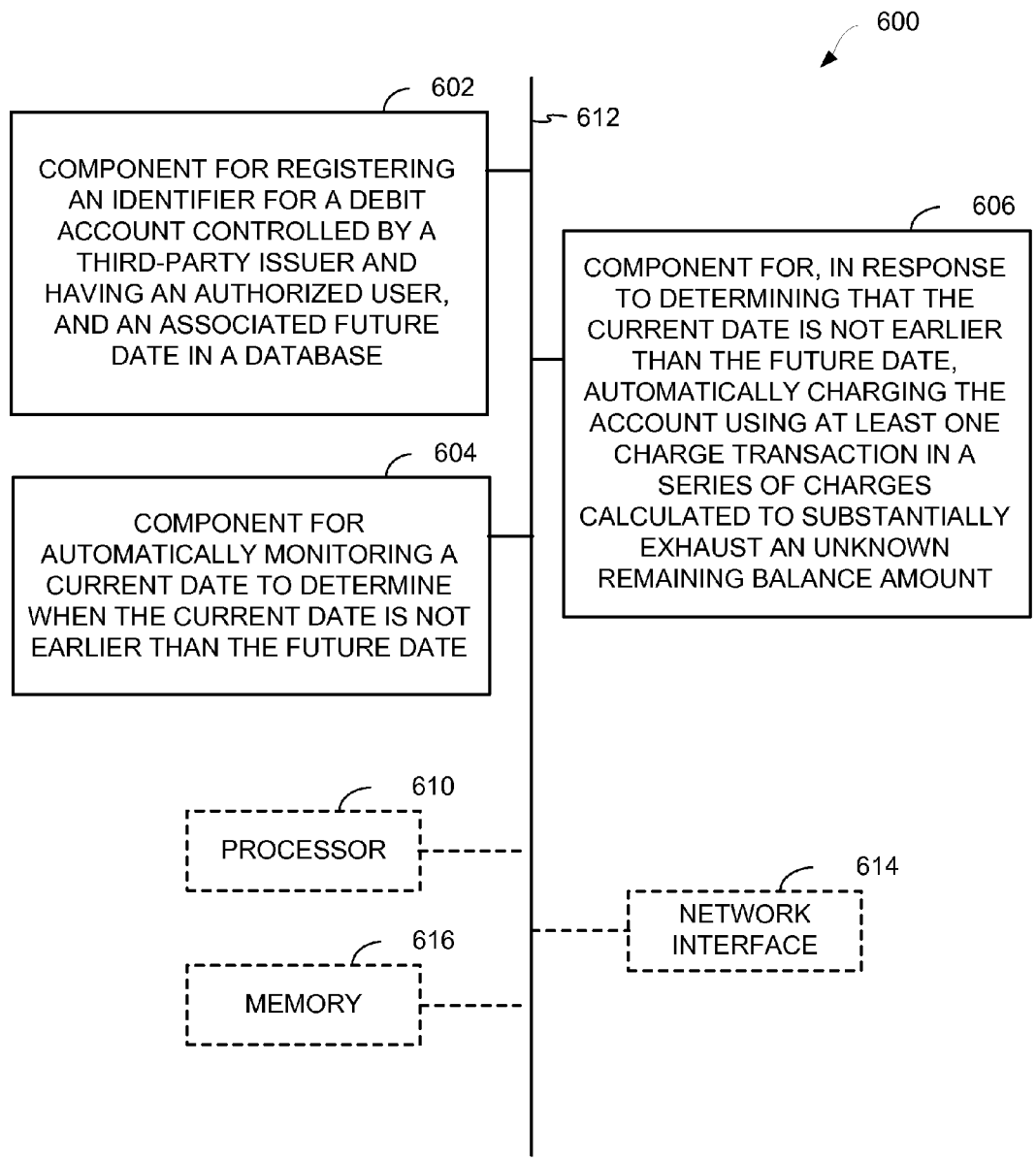
FIG. 6 is a block diagram illustrating an example of an apparatus for performing a method according to FIG. 1.

With reference to FIG. 6, there is provided an exemplary apparatus 600 that may be configured as a server in a computer network, or as a processor or similar device for use within the server entity, for interacting with one or more client devices and with commercial transaction servers for a debit card. The apparatus 600 may include functional blocks that can represent functions implemented by a processor, software, or combination thereof (e.g., firmware).

As illustrated, in one embodiment, the apparatus 600 may include an electrical component or module 602 for registering an identifier for a debit account controlled by a third-party issuer and having an authorized user, and an associated future termination date in a database. For example, the electrical component 602 may include at least one control processor coupled to a user interface for receiving user data and to a memory with instructions for registering the mentioned information. The apparatus 600 may include an electrical component 604 for automatically monitoring a current date to determine when the current date is not earlier than the future termination date; e.g., when the current date is equal to the termination date. For example, the electrical component 604 may include at least one control processor coupled to an electronic calendar and to a memory holding instructions for triggering another module based on the calendar date. The apparatus 600 may include an electrical component 604 for, in response to determining that the current date is not earlier than the future date, automatically charging the account using at least one charge transaction in a series of charges calculated to substantially exhaust an unknown remaining balance amount. For example, the electrical component 604 may include at least one control processor coupled to an algorithm for calculating a charge series and to a memory holding instructions for making and recording chares against a debit account held by a third party. The apparatus 600 may include similar electrical components for performing any or all of the additional operations described in connection with FIG. 2, which for illustrative simplicity are not shown in FIG. 6.

In related aspects, the apparatus 600 may optionally include a processor component 610 having at least one processor, in the case of the apparatus 600 configured as a server. The processor 610, in such case, may be in operative communication with the components 602-606 or similar components via a bus 612 or similar communication coupling. The processor 610 may effect initiation and scheduling of the processes or functions performed by electrical components 602-606.

In further related aspects, the apparatus 600 may include a network interface component 614. The apparatus 600 may optionally include a component for storing information, such as, for example, a memory device/component 616. The computer readable medium or the memory component 616 may be operatively coupled to the other components of the apparatus 600 via the bus 612 or the like. The memory component 616 may be adapted to store computer readable instructions and data for performing the activity of the components 602-606, and subcomponents thereof, or the processor 610, or the methods disclosed herein. The memory component 616 may retain instructions for executing functions associated with the components 602-606. While shown as being external to the memory 616, it is to be understood that the components 602-606 can exist within the memory 616.

Figure 7:
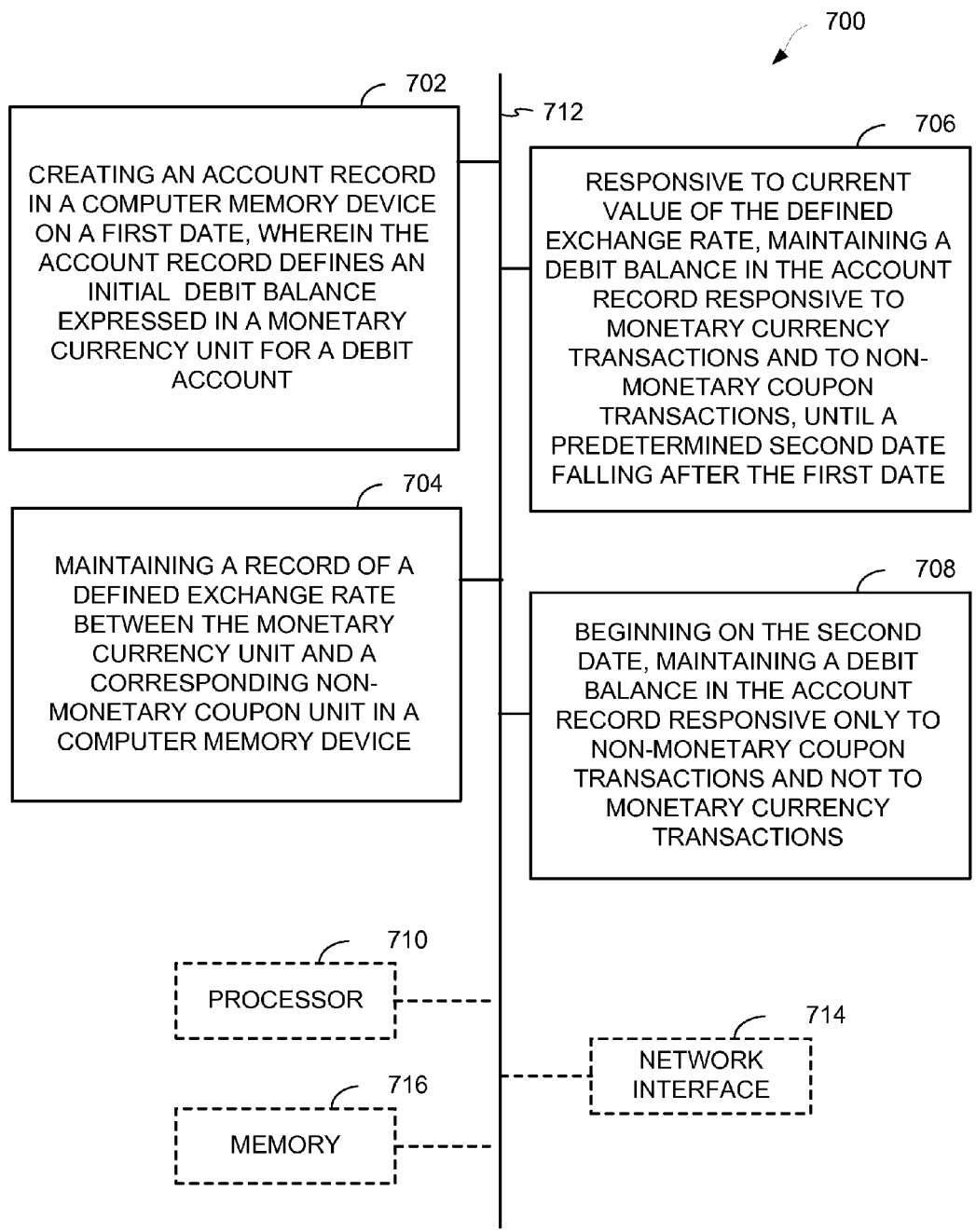
FIG. 7 is a block diagram illustrating an example of an apparatus for performing a method according to FIG. 2.

With reference to FIG. 7, there is provided an exemplary apparatus 700 that may be configured as a server in a computer network, or as a processor or similar device for use within the server entity, for interacting with one or more client devices and with commercial transaction servers for a debit card. The apparatus 700 may include functional blocks that can represent functions implemented by a processor, software, or combination thereof (e.g., firmware).

As illustrated, in one embodiment, the apparatus 700 may include an electrical component or module 702 for creating an account record in a computer memory device on a first date, wherein the account record defines an initial debit balance expressed in a monetary currency unit for a debit account. For example, the electrical component 702 may include at least one control processor coupled to a user interface or the like and to a memory with instructions for registering the mentioned data in response to user input. The apparatus 700 may include an electrical component 704 for maintaining a record of a defined exchange rate between the monetary currency unit and a corresponding non-monetary coupon unit in a computer memory device. For example, the electrical component 704 may include at least one control processor coupled to a network interface or the like and to a memory holding instructions for communicating with one or more external sources to update an exchange rate. The apparatus 700 may include an electrical component 706 responsive to current value of the defined exchange rate, for maintaining a debit balance in the account record responsive to monetary currency transactions and to non-monetary coupon transactions, until a predetermined second date falling after the first date. For example, the electrical component 706 may include at least one control processor coupled to a network interface or the like and to a memory holding instructions for communicating with one or more commerce servers and clients to update a balance in response to completed transactions. The apparatus 700 may include an electrical component 708 for, beginning on the second date, maintaining a debit balance in the account record responsive only to non-monetary coupon transactions and not to monetary currency transactions. For example, the electrical component 708 may include at least one control processor coupled to a network interface or the like and to a memory holding instructions for maintaining the debit balance solely in response to transactions using the non-monetary coupon. The apparatus 700 may include similar electrical components for performing any or all of the additional described in connection with FIG. 3, which for illustrative simplicity are not shown in FIG. 7.

In related aspects, the apparatus 700 may optionally include a processor component 710 having at least one processor, in the case of the apparatus 700 configured as a server. The processor 710, in such case, may be in operative communication with the components 702-708 or similar components via a bus 712 or similar communication coupling. The processor 710 may effect initiation and scheduling of the processes or functions performed by electrical components 702-708.

In further related aspects, the apparatus 700 may include a network interface component 714. The apparatus 700 may optionally include a component for storing information, such as, for example, a memory device/component 716. The computer readable medium or the memory component 716 may be operatively coupled to the other components of the apparatus 700 via the bus 712 or the like. The memory component 716 may be adapted to store computer readable instructions and data for performing the activity of the components 702-708, and subcomponents thereof, or the processor 710, or the methods disclosed herein. The memory component 716 may retain instructions for executing functions associated with the components 702-708. While shown as being external to the memory 716, it is to be understood that the components 702-708 can exist within the memory 716.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed, or include, a computer-readable medium if involving non-transient data storage. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for conditionally exhausting a debit balance in an account, comprising:
    registering an identifier for a debit account controlled by a third-party issuer and having an authorized user, and an associated future date in a database, using at least one computer;
    automatically monitoring a current date, using at least one computer, to determine when the current date is not earlier than the future date;
    in response to determining that the current date is not earlier than the future date, automatically charging the account using at least one charge transaction in a series of charges calculated to substantially exhaust an unknown remaining balance amount of the debit account, using at least one computer; and
    initiating a payment transaction for an amount computed using a total including one or more of successfully completed charges performed as part of the automatically charging the account, according to payment instructions received from the authorized user.

2. The method of claim 1, wherein automatically charging the account further comprises calculating the series of charges to comprise a series of diminishing amounts.

3. The method of claim 1, wherein automatically charging the account further comprises calculating an initial one of the series of charges based on an initial balance of the debit account reported by the user in conjunction with registering the identifier.

4. The method of claim 1, wherein automatically charging the account further comprises calculating one or more charges in the series of charges based at least in part on whether or not any preceding one of the series of charges is accepted by the third-party issuer.

5. The method of claim 1, wherein automatically charging the account further comprises calculating one or more charges in the series of charges based at least in part on an amount of any preceding one of the series of charges.

6. The method of claim 1, wherein automatically charging the account further comprises continuing the automatically charging using generally diminishing charge amounts until a charge amount not greater than a smallest applicable monetary unit is refused by the third-party issuer.

7. The method of claim 1, further comprising initiating the payment transaction for a non-monetary coupon amount restricted for use in a specified online environment.

8. A non-transitory computer-readable medium encoded with instructions configured so that execution of the instructions by a processor will cause a computer to perform the operations of:
    registering an identifier for a debit account controlled by a third-party issuer and having an authorized user, and an associated future date in a database;
    automatically monitoring a current date to determine when the current date is not earlier than the future date;
    in response to determining that the current date is not earlier than the future date, automatically charging the account using at least one charge transaction in a series of charges calculated to substantially exhaust an unknown remaining balance amount of the debit account; and
    initiating a payment transaction for an amount computed using a total including one or more of successfully completed charges performed as part of the automatically charging the account, according to payment instructions received from the authorized user.

9. The computer-readable medium of claim 8, wherein the instructions are further configured for calculating the series of charges to comprise a series of diminishing amounts.

10. The computer-readable medium of claim 8, wherein the instructions are further configured for calculating an initial one of the series of charges based on an initial balance of the debit account reported by the user in conjunction with registering the identifier.

11. The computer-readable medium of claim 8, wherein the instructions are further configured for calculating one or more charges in the series of charges based at least in part on whether or not any preceding one of the series of charges is accepted by the third-party issuer.

12. The computer-readable medium of claim 8, wherein the instructions are further configured for calculating one or more charges in the series of charges based at least in part on an amount of any preceding one of the series of charges.

13. The computer-readable medium of claim 8, wherein the instructions are further configured for continuing the automatically charging using generally diminishing charge amounts until a charge amount not greater than a smallest applicable monetary unit is refused by the third-party issuer.

14. The computer-readable medium of claim 8, wherein the instructions are further configured for initiating the payment transaction for a non-monetary coupon amount restricted for use in a specified online environment.

* * * * *